(12) United States Patent
Zhou et al.

(10) Patent No.: US 11,318,384 B2
(45) Date of Patent: May 3, 2022

(54) METHOD AND APPARATUS FOR CONTROLLING VIRTUAL CAMERA IN GAME

(71) Applicant: NETEASE (HANGZHOU) NETWORK CO., LTD., Zhejiang (CN)

(72) Inventors: Wenchao Zhou, Zhejiang (CN); Kun Shao, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 17/043,698

(22) PCT Filed: Apr. 12, 2019

(86) PCT No.: PCT/CN2019/082509
§ 371 (c)(1),
(2) Date: Sep. 30, 2020

(87) PCT Pub. No.: WO2020/124889
PCT Pub. Date: Jun. 25, 2020

(65) Prior Publication Data
US 2021/0402298 A1    Dec. 30, 2021

(30) Foreign Application Priority Data
Dec. 19, 2018 (CN) .......................... 201811558200.3

(51) Int. Cl.
*A63F 13/5255*    (2014.01)

(52) U.S. Cl.
CPC .............................. *A63F 13/5255* (2014.09)

(58) Field of Classification Search
CPC .......... A63F 13/25; A63F 13/50; A63F 13/52; A63F 13/525; A63F 13/5252; A63F 13/5258; A63F 13/53; A63F 2300/30; A63F 2300/6661; A63F 2300/6669; A63F 2300/6684; G06T 15/20
See application file for complete search history.

(56) References Cited

U.S. PATENT DOCUMENTS

2011/0172013 A1    7/2011    Shirasaka et al.
2014/0066195 A1    3/2014    Matsui et al.

FOREIGN PATENT DOCUMENTS

| CN | 104267904 A | 1/2015 |
| CN | 107823882 A | 3/2018 |
| CN | 108144293 A | 6/2018 |
| CN | 108376424 A | 8/2018 |

*Primary Examiner* — Omkar A Deodhar
(74) *Attorney, Agent, or Firm* — Gang Yu (57) ABSTRACT

A method and apparatus for controlling a virtual camera in a game are disclosed. In the present application, a virtual camera is controlled to shift in response to a first touch operation for a visual field control region, and the virtual camera is controlled to enter a locked state according to a locking operation, thereby locking a game scene captured by the shifted virtual camera as a game scene rendered on a graphical user interface until restoring to control the movement of the virtual camera according to the position change of a virtual character when the locked state is unlocked.

20 Claims, 6 Drawing Sheets

```
┌─────────────────────────────────────┐
│ A virtual camera is associated with a position │
│ of a virtual character in a game scene to      │
│ control the movement of the virtual camera     │──S402
│ according to the position change of the virtual│
│            character                            │
└─────────────────────────────────────┘
                    │
┌─────────────────────────────────────┐
│ A visual field control region is provided in the│
│ GUI, in response to a first touch operation for │
│ the visual field control region, the virtual    │
│ camera is controlled to shift according to the  │──S404
│ first touch operation, and a game scene         │
│ captured by the shifted virtual camera is       │
│         rendered on the GUI                      │
└─────────────────────────────────────┘
                    │
┌─────────────────────────────────────┐
│ In response to a preset virtual camera locking │
│ operation, the virtual camera is controlled to  │
│ enter a locked state, and the game scene        │──S406
│ captured by the Shifted virtual camera is       │
│ locked as the game scene rendered on the        │
│                  GUI                             │
└─────────────────────────────────────┘
                    │
┌─────────────────────────────────────┐
│ In response to trigger of a preset unlocking    │
│ condition, the locked state is unlocked to      │
│ restore to control the movement of the virtual  │──S408
│ camera according to the position change of the  │
│           virtual character                      │
└─────────────────────────────────────┘
```

METHOD AND APPARATUS FOR CONTROLLING VIRTUAL CAMERA IN GAME

CROSS-REFERENCE TO RELATED APPLICATIONS

The present disclosure claims priority of Chinese Patent Application No. 201811558200.3, filed to the China Patent Office on Dec. 19, 2018, entitled "Method and Apparatus for Controlling Virtual Camera in Game", the contents of which are hereby incorporated by reference in its entirety.

TECHNICAL FIELD

The present disclosure relates to the technical field of games, and in particular, to a method and apparatus for controlling a virtual camera in a game.

BACKGROUND

In depression-angle large scroll map-type games such as Multiplayer Online Battle Arena (MOBA) games, most of the MOBA games are to fix hero characters controlled thereby in the middle or nearby positions of a screen, while the role distance of some skills is very far, even exceeding the game screen. The player knows nothing about the role of the skill, and cannot effectively use the distance advantages of this skill.

SUMMARY

According to an embodiment of the present disclosure, a method for controlling a virtual camera in a game is provided. The method may be applied to a touch terminal rendered with a Graphical User Interface (GUI), content rendered on the GUI may include a game scene captured by a virtual camera, the game scene may at least include a virtual character, and the method may include that:

the virtual camera is associated with a position of the game scene where the virtual character is located to control the movement of the virtual camera according to the position change of the virtual character;

a visual field control region is provided on the GUI, in response to a first touch operation acting on the visual field control region, the virtual camera is controlled to shift according to the first touch operation, and a game scene captured by the shifted virtual camera is displayed on the GUI;

in response to a preset virtual camera locking operation, the virtual camera is controlled to enter a locked state, and the game scene captured by the shifted virtual camera is locked to the game scene displayed on the GUI; and in response to trigger of a preset unlocking condition, the locked state is unlocked to restore to control the movement of the virtual camera according to the position change of the virtual character.

According to another embodiment of the present disclosure which provides an apparatus for controlling a virtual camera in a game. The apparatus may be applied to a touch terminal rendered with a GUI. Content rendered on the GUI may include a game scene captured by a virtual camera. The game scene may at least include a virtual character. The apparatus may include:

an association module, configured to associate the virtual camera with a position of the game scene where the virtual character is located to control the movement of the virtual camera according to the position change of the virtual character;

a response module, configured to provide a visual field control region on the GUI, respond to a first touch operation acting on the visual field control region, control the virtual camera to shift according to the first touch operation, and display a game scene captured by the shifted virtual camera on the GUI;

a locking module, configured to control, in response to a preset virtual camera locking operation, the virtual camera to enter a locked state, and lock the game scene captured by the shifted virtual camera to the game scene displayed on the GUI; and an unlocking module, configured to unlock, in response to trigger of a preset unlocking condition, the locked state to restore to control the movement of the virtual camera according to the position change of the virtual character.

According to another embodiment of the present disclosure which provides a storage medium, the virtual camera is associated with a position of the game scene where the virtual character is located to control the movement of the virtual camera according to the position change of the virtual character;

a visual field control region is provided on the GUI, in response to a first touch operation acting on the visual field control region, the virtual camera is controlled to shift according to the first touch operation, and a game scene captured by the shifted virtual camera is displayed on the GUI;

in response to a preset virtual camera locking operation, the virtual camera is controlled to enter a locked state, and the game scene captured by the shifted virtual camera is locked to the game scene displayed on the GUI; and in response to trigger of a preset unlocking condition, the locked state is unlocked to restore to control the movement of the virtual camera according to change of the position of the virtual character.

According to another embodiment of the present disclosure which provides an electronic device. The device may include a memory and a processor. The memory is connected with the processor and configured to store at least one executable instruction of the processor, wherein the processor is arranged to execute the at least one executable instruction, and the at least one executable instruction comprises: the virtual camera is associated with a position of the game scene where the virtual character is located to control the movement of the virtual camera according to the position change of the virtual character;

a visual field control region is provided on the GUI, in response to a first touch operation acting on the visual field control region, the virtual camera is controlled to shift according to the first touch operation, and a game scene captured by the shifted virtual camera is displayed on the GUI;

in response to a preset virtual camera locking operation, the virtual camera is controlled to enter a locked state, and the game scene captured by the shifted virtual camera is locked to the game scene displayed on the GUI; and in response to trigger of a preset unlocking condition, the locked state is unlocked to restore to control the movement of the virtual camera according to the position change of the virtual character.

BRIEF DESCRIPTION OF THE DRAWINGS

The accompanying drawings that constitute a part of the present application are used to provide a further understanding of the present disclosure, and the exemplary embodiments of the present disclosure and the description thereof are used to explain the present disclosure, but do not constitute improper limitations to the present disclosure. In the drawings:

FIG. 5-1 is a schematic diagram of a region desired to be observed by a user according to an embodiment of the present disclosure;

FIG. 5-2 is a schematic diagram of a region captured by a camera after screen dragging according to an embodiment of the present disclosure;

FIG. 6-1 is a schematic diagram of a game scene captured by a camera after screen dragging according to an embodiment of the present disclosure;

FIG. 6-2 is a schematic diagram of a game scene captured by a camera after screen dragging according to another embodiment of the present disclosure;

DETAILED DESCRIPTION OF THE EMBODIMENTS

It is to be noted that in the case of no conflict, the features in the embodiments and the embodiments in the present disclosure may be combined with each other. The disclosure is described below with reference to the drawings and in conjunction with the embodiments in detail.

In order to make those skilled in the art better understand the solutions of the present disclosure, the technical solutions in the embodiments of the present disclosure will be clearly and completely described below with reference to the drawings in the embodiments of the present application. It is apparent that the described embodiments are only a part of the embodiments of the present disclosure, not all of the embodiments. All other embodiments obtained by those of ordinary skill in the art based on the embodiments of the present application without creative efforts should fall within the scope of protection of the present application.

It is to be noted that the terms "first", "second" and the like in the specification and claims and the drawings of the present disclosure are used to distinguish similar objects, and do not need to describe a specific sequence or a precedence order. It will be appreciated that data used in such a way may be exchanged under appropriate conditions, in order that the embodiments of the present disclosure described here can be implemented. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

Figure 2:
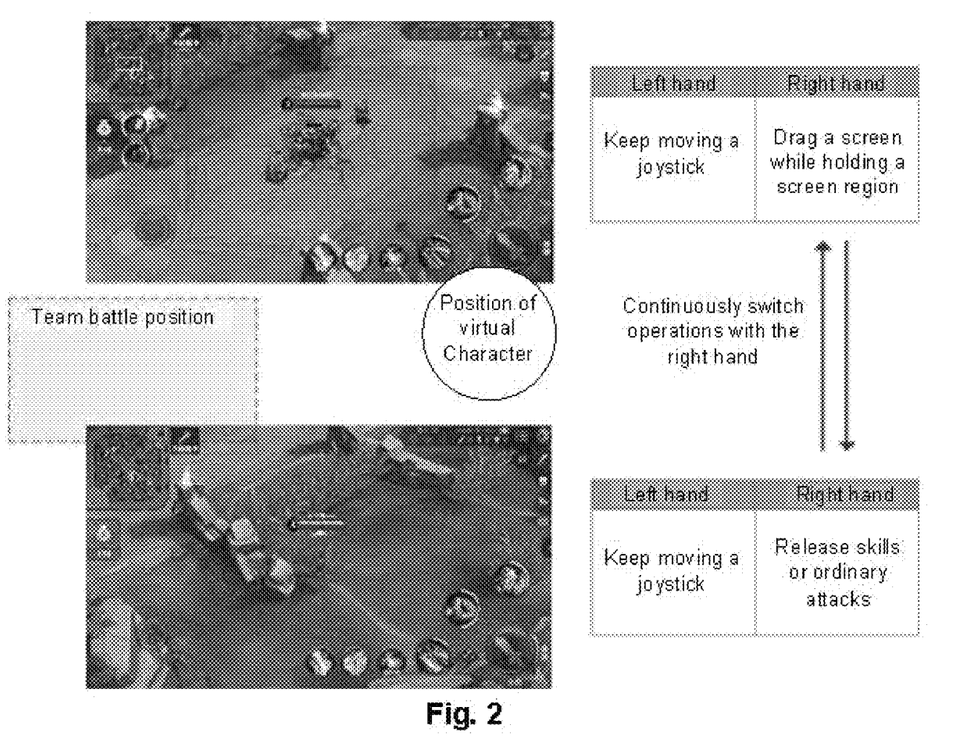
FIG. 2 is a schematic diagram of implementing a screen dragging operation in an existing game.

FIG. 2 is a schematic diagram of a skill operation in an existing game. In a top-down scroll map game, a player continuously controls the movement of a game character/virtual character with the left hand and frequently switches an operation of releasing a skill or making an ordinary attack and an operation of dragging a screen (referred to as "screen dragging" or "screen dragging operation) with the right hand. Usually, the player firstly drags the screen with the right hand to observe a battlefield outside the screen. When the time is right, the player loosens a dragged screen region and presses a skill button to enter the battlefield with the right hand, drags the screen again to observe the battlefield after releasing the skill, and loosens again and releases the skill again. The operation is repeated for many times. This operation has high operation difficulty. Frequent switching with the right hand will increase the risk of misoperation. After screen dragging with the right hand is loosened, the camera flashes back to its hero screen, that is, a picture where the virtual character is located. If the screen is dragged once again, the camera is switched to the battlefield outside the screen. The operation is repeated. A game master will even switch back and forth at high speed. The rapid switching of the picture will cause extreme visual discomfort.

Figure 3:
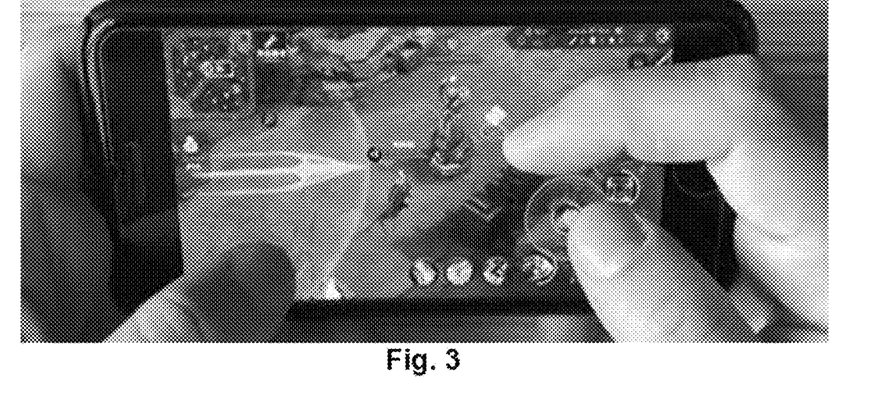
FIG. 3 is another schematic diagram of implementing a screen dragging operation in an existing game.

It is to be noted that the "top-down angle" in the "top-down scroll map type game" here refers to viewing games from a high level to a low level and classifying the games according to the perspective. The present disclosure studies top-down games, such as games like "Alien Shooter" and "Killzone". "Scroll map type" in "top-down scroll map type game" means that the background of the game looks like a scrolling scroll. In a top-down scroll map type game, the player manipulates a virtual character in the game, fires bullets or skills towards the incoming enemy and dodges the enemy's attack. The controlled virtual character can be seen on the game screen, and the player is like a bystander or controller, rather than the first person of the virtual character, and can observe some places that cannot be seen by the first person. Here the top-down scroll map type game may include a Real-Time Strategy Game (RTS), MOBA, a Role-playing game (RPG), etc., excluding First-person Shooter (FPS). As shown in FIG. 3, the inventor also found that when the player operates, the player continuously controls movement with the left hand and controls an operation of releasing a skill or making an ordinary attack (usually with the thumb) and an operation of dragging a screen (usually with the index finger) with two fingers of the right hand respectively. The operation mode is commonly known as "C hand" or "three fingers". The C-hand operation may be divided into left C-hand and right C-hand. Left C-hand refers to controlling a small map with the left index finger and controlling movement with the left thumb. Right C-hand refers to controlling screen dragging with the right index finger and controlling skill release and ordinary attacks with the right thumb. FIG. 3 shows a control mode of right C-hand. Although the operation mode does not require frequent back and forth operations with one finger of the right hand, the operation is very difficult and requires the strong finger coordination ability of the player, which is generally only completed by professional players.

Figure 1:
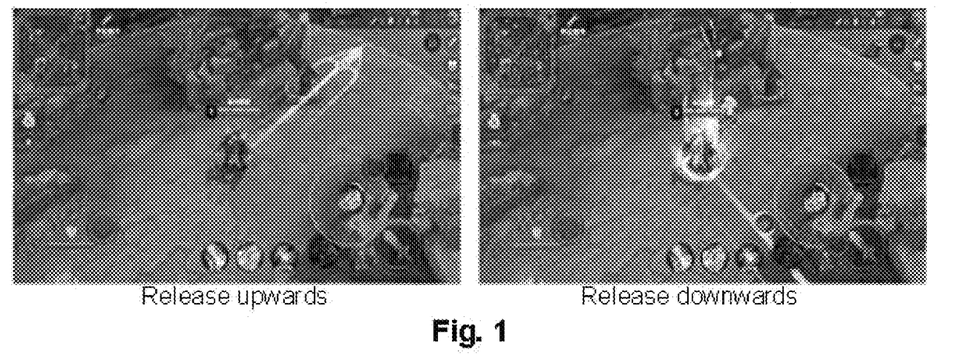
FIG. 1 is a schematic diagram of releasing game skills from different perspectives in an existing game.

In addition, because some MOBA games use an angle of view that tilts part of the angle, this will cause that the full range can be seen if some skills are released upwards, but only part of the range or only half of the range can be seen if some skills are released downwards. As shown in FIG. 1, this will cause great disadvantages. Coupled with the limitation of a screen of a viewing angle output device (a mobile phone, a tablet, etc.), if a player needs to observe a game scene outside a screen where a character is located, the player needs to drag the screen.

When dragging the screen, it is necessary to take an additional hand (usually the right hand), but many times, especially when facing fierce confrontation, the player needs to control a movement operation of a hero character with the left hand and needs to be prepared for a skill operation with the right hand. The player needs to frequently switch between skill release and screen dragging, or the player cannot drag the screen with any hand to keep continuously observing a scene worthy of attention. Therefore, when the game character controlled by the player travels to the region, the strategic purpose of the player cannot be effectively achieved because the information of the region has changed significantly.

Figure 4:
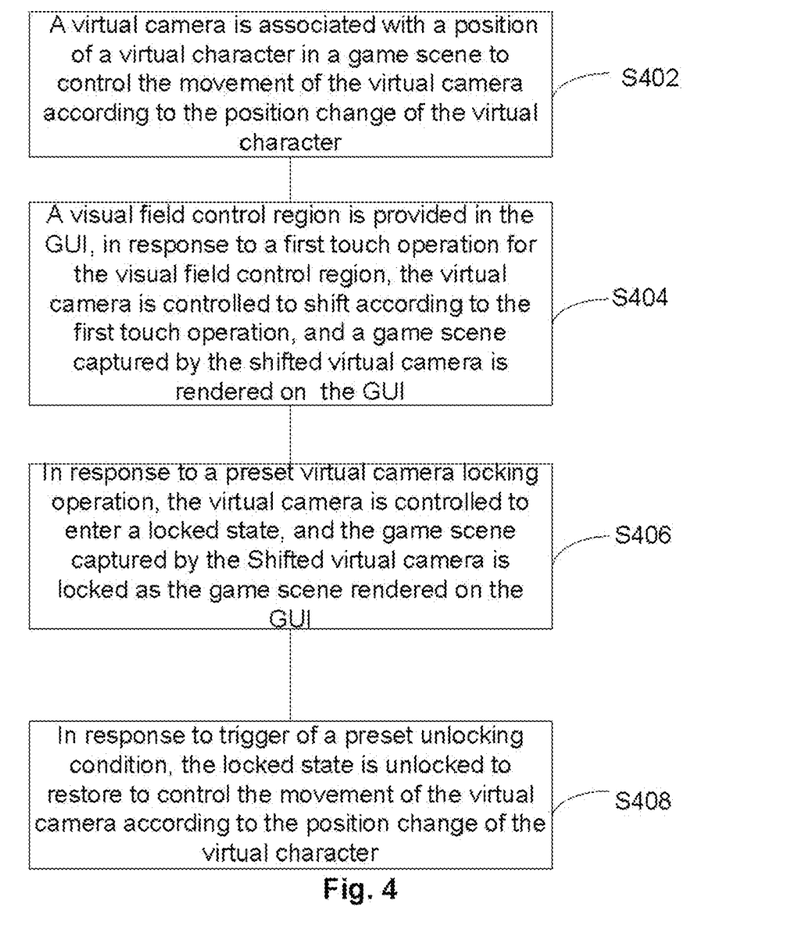
FIG. 4 is a schematic flowchart of a method for controlling a virtual camera in a game according to an embodiment of the present disclosure.

Through the research on the above existing solutions, the present disclosure optimizes the operation mode of dragging the screen, as shown in FIG. 4. A method for controlling a virtual camera in a game provided by an embodiment of the present disclosure is applied to a touch terminal capable of presenting a GUI, content displayed by the GUI includes a game scene captured by a virtual camera, and the game scene includes at least one virtual character. The method specifically includes the following steps.

In S402, the virtual camera is associated with a position of the game scene where the virtual character is located to control the movement of the virtual camera according to the position change of the virtual character.

In this method, a virtual camera (herein referred to as a "camera") is associated with the position of a virtual character in a game scene, that is, an association relationship between the position of the virtual camera and the position of the virtual character in the game scene is established, for example, a mapping relationship for maintaining a fixed distance between the position of the virtual camera and the position of the virtual character in the game scene is established. The shooting angle of the virtual camera may be maintained at a default angle. Therefore, when the position of the virtual character changes, the virtual camera also moves.

In S404, a visual field control region is provided on the GUI, in response to a first touch operation acting on the visual field control region, the virtual camera is controlled to shift according to the first touch operation, and a game scene captured by the shifted virtual camera is displayed on the GUI.

The GUI is an important part of a touch screen terminal. A user may operate the GUI which is as an interface for interacting with a user. In addition to displaying the game scene captured through the virtual camera, the GUI may also receive touch operations from the user through the touch screen, for example, control the game running in a touch terminal.

Figure 51:
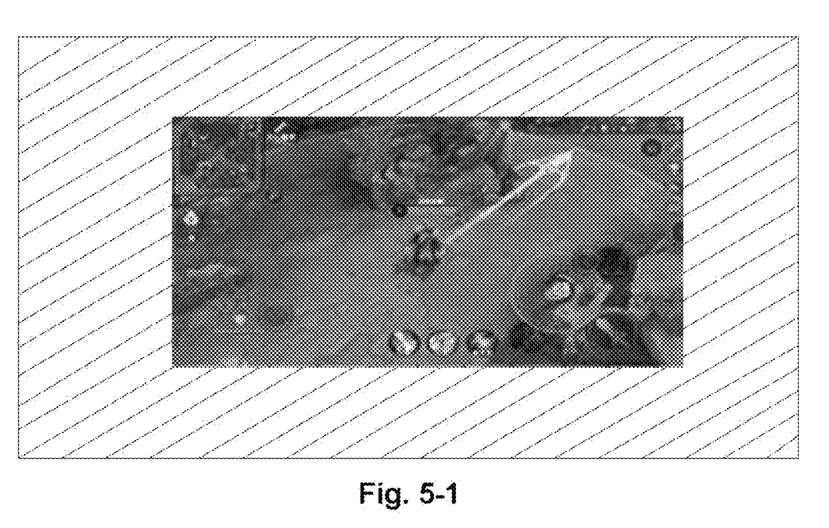

When the player/user wants to observe the dynamics outside the screen, as shown in FIG. 5-1, the slash region in FIG. 5-1 is outside the screen, but it is the range that the player wants to observe. Therefore, it is necessary to adjust the game scene displayed on the screen, and pull the image outside the screen into the current screen for display. Therefore, a visual field control region is provided on the GUI, the visual field control region being used to adjust the screen display content according to an operation instruction. In the embodiments of the present disclosure, a user may perform a first touch operation in the visual field control region to achieve the purpose of adjusting the screen display content. The first touch operation herein may refer to a screen dragging operation, which refers to that the user presses the visual field control region with a finger and drags the screen, that is, a game scene slides with the finger.

When a terminal detects the first touch operation, the first touch operation is responded, a virtual camera is controlled to shift according to the first touch operation. For example, the shifting direction of the virtual camera may be determined according to an acting direction of the first touch operation on the screen. Optionally, the shifting direction of the virtual camera is consistent with the movement direction of a touch point generated by the first touch operation on the touch screen. When the virtual camera shifts, the game scene captured by the virtual camera also changes accordingly. Therefore, the game scene captured by the shifted virtual camera is displayed on the GUI.

When the user performs the first touch operation, it indicates that the user wants to observe the game scene in the direction of the first touch operation. Therefore, the present disclosure determines the acting direction of the first touch operation as the shifting direction of the virtual camera, which is in line with user expectations.

Further, the shifting distance of the virtual camera may also be determined according to the distance or/and speed of the touch point generated by the first touch operation on the touch screen.

In S406, a preset virtual camera locking operation is responded, the virtual camera is controlled to enter a locked state, and the game scene captured by the shifted virtual camera is locked as the game scene rendered on the GUI.

In the embodiments of the present disclosure, in order to allow users to conveniently browse images outside a screen display region, the virtual camera shifts by the first touch operation to display images obtained after the shift in the current screen. In order to further satisfy the demands of user browsing, in the embodiments of the present disclosure, according to the locking operation, the virtual camera may be controlled to enter a locked state, and the game scene captured by the shifted virtual camera is locked as the game scene rendered on the GUI. That is, the image rendered on the GUI by the shifted virtual camera is locked. When the virtual camera is in the locked state, the image displayed on the GUI remains unchanged. The preset virtual camera locking operation here includes an operation of pressing a touch screen of the touch terminal, and the operation is used to trigger the operation which is to lock the adjusted game scene displayed on the GUI. That is, in the present disclosure, an interface after dragging the screen may be locked by the operation of the user. For example, if the current screen is pressed (a 3D touch function of an IOS system is started), the camera may be fixed in this region. At this time, the camera no longer follows the virtual character/hero, but is locked at the current map position.

When the player drags the screen with a small distance, it means that the player just wants to observe the region around the hero, or can better target when wanting to release a longer-distance skill. Therefore, after the game scene displayed on the GUI is adjusted, the present disclosure skillfully designs a locking function. More preferably, before controlling the virtual camera to enter the locked state, it also includes determining that the distance moved by the touch point of the first touch operation is within a preset range, that is, the distance of movement of the screen dragged by the screen dragging operation is within a preset range.

Figure 52:
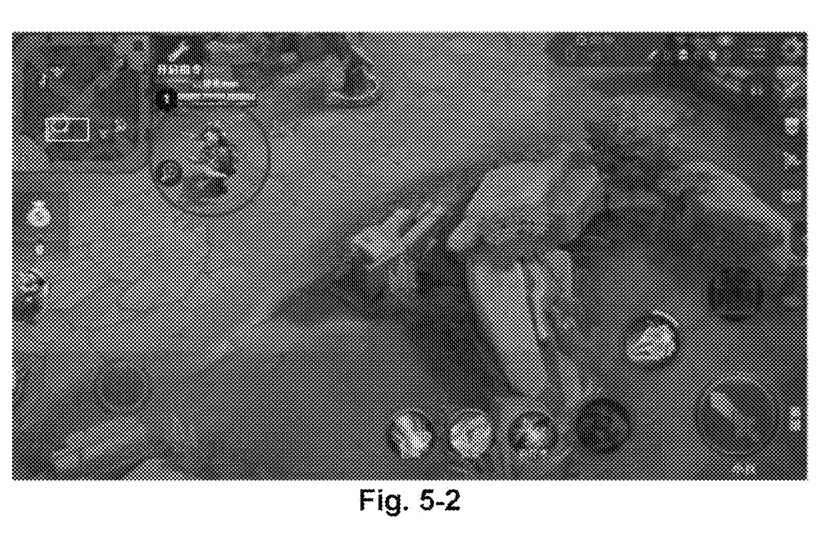

The locking mentioned here means that a game system automatically locks the screen shifting position. At this time, although the game character/virtual character is not currently in the middle or near the screen, it may have a very good visual field. Referring to the game scene displayed in the screen after the screen dragging lock shown in FIG. 5-2, the shaded part in FIG. 5-2 is a newly obtained observation region.

In S408, in response to trigger of a preset unlocking condition, the locked state is unlocked to restore the state of controlling the movement of the virtual camera according to the position change of the virtual character.

When the preset unlocking condition is detected, the game system unlocks the locked state of the virtual camera, and the virtual camera is restored to follow the virtual character/hero, that is, moves with the position change of the virtual character/hero, and adjusts to a normal game interface.

Further, after the virtual camera is controlled to enter the locked state and before the locked state of the virtual camera is unlocked, the method further includes that:

a third touch operation for adjusting the virtual camera is received; and an error response is output for the third touch operation.

When the virtual camera is in the locked state, if the user performs the third touch operation that controls the movement of the virtual character or other adjustments to the virtual camera, the virtual camera has not been unlocked at this time, so the game system will output an error response for other adjustment operations, such as a feedback error message or a response timeout. The third touch operation for adjusting the virtual camera mentioned here does not include an operation of unlocking the locked state of the virtual camera.

It is to be noted that the steps shown in the flowchart of FIG. 4 may be executed in a computer system including, for example, a set of computer-executable instructions. Moreover, although a logic sequence is shown in the flowchart, the shown or described steps may be executed in a sequence different from the sequence here under certain conditions.

As can be seen from the above, in the present disclosure, in response to a first touch operation for a visual field control region in a GUI, a virtual camera is controlled to shift according to the first touch operation, and the virtual camera is controlled to enter a locked state according to a locking operation, thereby locking a game scene captured by the shifted virtual camera as a game scene rendered on a graphical user interface until restoring to control the movement of the virtual camera according to the position change of a virtual character when the locked state is unlocked. Therefore, after the user drags the screen, the camera may be maintained in the current image scene, so that even if the virtual character is not in the middle of the screen, it can also have a very good visual field. It is more convenient to observe an image scene after dragging the screen, thereby the problems of high difficulty in frequent screen dragging operations or long-time screen dragging operations and easy misoperation are solved.

As an optional implementation manner, in the method for controlling the virtual camera in a game provided by the present disclosure, after the virtual camera enters the locked state, the locked state is unlocked in response to trigger of the preset unlocking condition. Here, the preset relief condition may be:

detecting a second touch operation acting on the GUI; or, detecting that a duration of the virtual camera entering the locked state satisfies a first preset duration; or, detecting that a distance between the virtual character and a current location of the virtual camera exceeds a first preset distance; or, detecting that a distance of movement of the virtual character exceeds a second preset distance after the virtual camera enters the locked state.

An unlocking region may be provided on the GUI. When the second touch operation is received in the unlocking region, the unlocking of the virtual camera may be triggered. The second touch operation here may be a clicking operation. Of course, the touch operation may also be received in any region of the GUI, which is not limited in the present disclosure.

Of course, it may also be unlocked automatically when the time of staying at a position after camera shifting satisfies a certain duration, users are provided with a certain period of time to observe the game scene after shifting, and then the camera automatically restores to the position before shifting and moves with the virtual character. The certain duration here is a first preset duration. The length of the first preset duration may be determined according to the game operation habits of the users. For example, during the previous game operations, the user triggers unlocking by the second touch operation. When a preset number of times is satisfied, it changes to automatic unlocking according to the duration of staying at a shifting position. At this time, the staying duration of automatic unlocking may be determined according to the duration that the user actively unlocks previously by the second touch operation.

In another preferred implementation manner, whether the unlocking condition is true can also be determined according to the movement of the virtual character. When the virtual camera is in the locked state, the player can also control the virtual character to move, but the virtual camera remains locked when the virtual character moves. The game scene displayed on the GUI does not change until the distance between the position of the virtual character in the game scene and the current position of the virtual camera exceeds a first preset distance. At this time, the virtual camera can be unlocked automatically, or when the virtual character moves more than a second preset distance starting when the virtual camera enters the locked state, the virtual camera is automatically unlocked. According to the movement of the virtual character, it can be seen that the game player wants to enter other regions for fighting or observation. Therefore, in the embodiments of the present disclosure, automatic unlocking is provided, which meets the expectations of the game player and can improve the user experience.

In the embodiments of the present disclosure, the game scene captured by the shifted virtual camera is locked as the game scene rendered on the GUI. The locking mode is configurable. After locking, unlocking may be achieved if certain conditions are met. For example, in the locked state, the user can simply click on the screen, or stop for a certain period of time, or move the virtual character for a certain distance, the camera will return to the normal state, and the unlocking mode is also configurable.

The technical solution of the present disclosure is described below with reference to a preferred implementation manner. In the present disclosure, the operation that the locked state is unlocked includes that: the virtual camera is controlled to move from a current location to a location before shifting. The operation specifically includes that:

it is detected whether the virtual character in the game towards the current location of the virtual camera;

when it is determined that the virtual character in the game towards the current location of the virtual camera, the virtual camera is controlled to move from the current location to the location before shifting in a speed descending manner; and when it is determined that the virtual character in the game dose not toward the current location of the virtual camera, the virtual camera is controlled to move from the current location to the location before shifting in a speed ascending manner.

In the embodiments of the present disclosure, when the virtual camera is unlocked, the virtual camera needs to be returned to the normal position, that is, moves from the current position to the position before shifting, so as to restore the movement of the virtual camera to follow the position change of the virtual character. Before returning, it is first detected whether the virtual character in the current game scene is facing the location of the virtual camera. If the virtual character is facing the current location of the virtual camera, the virtual camera slowly returns to the position before shifting, during the slow return process, the speed gradually decreases. If the virtual character does not face the current location of the virtual camera, the virtual camera slowly returns to the position before shifting, during the slow return process, the speed gradually increases. The acceleration in the gradual increase or decrease in speed may be constant or variable, which is not limited in the present disclosure. It is to be noted that not facing the virtual camera here includes facing away from the current position of the virtual camera, and also includes facing away from the current position of the virtual camera diagonally.

Specifically, in the traditional mode of dragging a screen, dragging the screen and releasing the finger may be flashback. During the actual game, the player needs to constantly switch between the hero and the scene. The implementation manner of the present disclosure implements that the restoration of the virtual camera is slow, there is a transition phase, and the speed of restoration is configurable. And the embodiments of the present disclosure can intelligently adjust the returning process. As the camera slowly returns, it will judge the orientation of the player.

Figure 61:
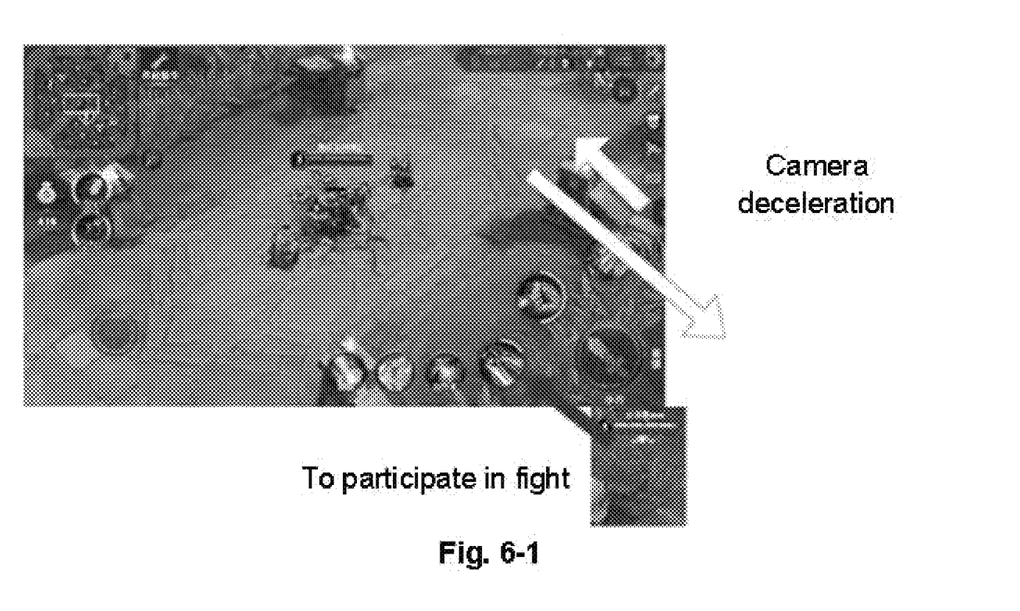

As shown in FIG. 6-1, FIG. 6-1 shows the game scene captured by the camera after dragging the screen, which contains the battle scene. If the player is advancing toward the battlefield (that is, the position of the camera after dragging the screen), it means that the player wants to enter the battlefield. The player is about to enter the battlefield. The information on this battlefield is very important. Then the speed of the camera return to normal gradually decreases. This will give the player a buffer time when moving into the battlefield. The line of sight of the player can still remain in the battlefield region, and at the same time can also consider own movement. The battlefield here refers to a scene region where the two parties in the game play a game battle or a scene region where the enemy unit is located in the game. The judgment of the battlefield can be determined by the game system according to preset logics.

Figure 62:
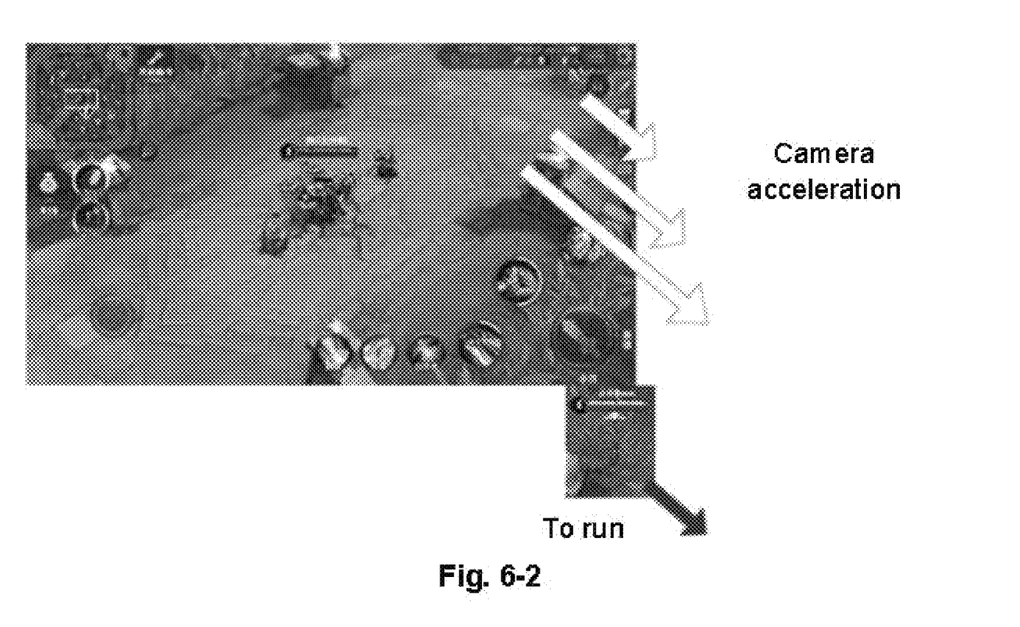

As shown in FIG. 6-2, FIG. 6-2 shows the game scene captured by the camera after dragging the screen, which contains the battle scene. If the player is advancing away from the battlefield (that is, the position of the camera after dragging the screen), it means that the player wants to leave the battlefield. The urgency of the player leaving is higher than the knowledge of the current battlefield information. Then, the returning speed of the camera is increased.

Meanwhile, in order to prevent the speed of the camera caused by in-situ circling of the player, the movement speed of the camera will only be adjusted after the player has held the direction for a certain amount of time. That is, before the virtual camera is controlled to move from the current location to the location before shifting in a speed descending manner or the virtual camera is controlled to move from the current location to the location before shifting in a speed ascending manner, the method includes that: it is determined that a duration of keeping the virtual character in the current orientation satisfies a second preset duration. That is, the movement speed of the camera will only be adjusted after the player has held the direction for a certain amount of time.

Figure 7:
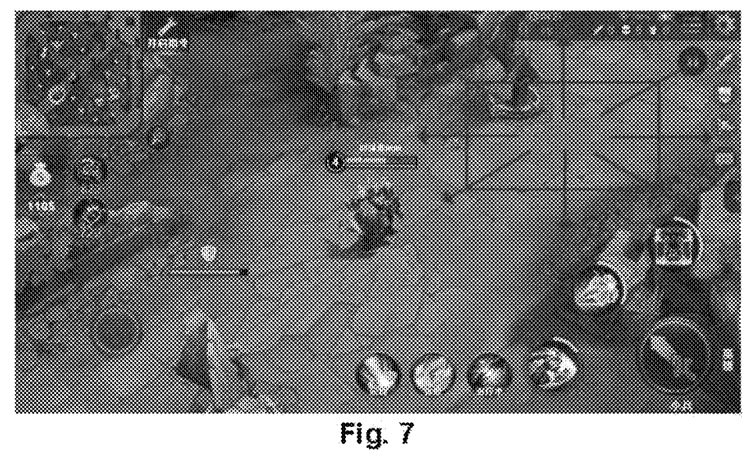
FIG. 7 is a schematic diagram of an operation mode for controlling a virtual camera to shift according to an embodiment of the present disclosure.

As an optional implementation manner, in the present embodiment, an interactive mode for adjusting the virtual camera is improved. The first touch operation and the second touch operation are both swipe operations, the second touch operation and the first touch operation act in opposite directions, the swipe operation refers to that the user gently slides on the visual field control region with a finger, and the game scene does not slide with the finger. That is, in the embodiments of the present disclosure, a "swipe" gesture operation is used to complete the locking and positioning of the dragged screen, and the swipe direction of a finger is detected to fix the virtual camera at a position in this direction. Referring to FIG. 7, the directions of swiping to various regions are shown by arrows in FIG. 7. The screen may be positioned at a position in a direction after swiping to a certain arrow direction instead of holding the screen and dragging it to a position in the direction. When the shifted camera is locked, the player can also use the reverse swipe gesture to return the screen to a normal position, that is, the position before the shift, so as to more naturally achieve the psychological expectations of the player, simple operation and easy entry.

As can be seen from the above, the embodiments of the present disclosure provide a more flexible and friendly control operation mode by returning after screen dragging locking. After the user can click or swipe, the virtual camera slowly returns to the original position. The returning speed is intelligently adjusted according to the current situation of the virtual character, which more satisfies the user expectations. Players only need to perform simple operations to place the camera in a suitable position, which will not conflict with the original left-right handed operation, and the players may focus on the truly fun operation experience. The convenience of camera switching in MOBA games is improved, thereby allowing players to fully utilize their distance advantages when releasing long-distance skills. In addition, due to its convenient camera control, game designers can design more distant skills, which will bring tactical changes and gameplay diversity without worrying about the resulting balance and operational problems.

Figure 8:
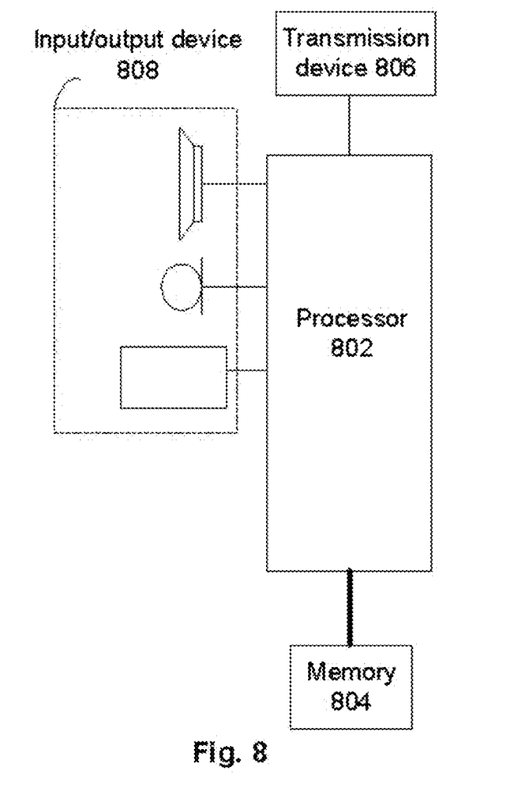
FIG. 8 is a block diagram of a hardware structure of a mobile terminal running a method for controlling a virtual camera in a game according to an embodiment of the present disclosure.

The method embodiment provided by the embodiments of the present application may be executed in a mobile phone, a tablet, or a similar touch screen control device. Running on a mobile terminal is taken as an example. FIG. 8 is a block diagram of a hardware structure of a mobile terminal for a method for controlling a virtual camera in a game according to an embodiment of the present disclosure. As shown in FIG. 8, the mobile terminal may include one or more (only one is shown in FIG. 1) processors 802 (the processor 802 may include but is not limited to a processing apparatus such as a Micro Controller Unit (MCU) or a Field Programmable Gate Array (FPGA)) and a memory 804 for storing data. Optionally, the above mobile terminal may further include a transmission device 806 and an input/output device 808 for communication functions. Those skilled in the art can understand that the structure shown in FIG. 8 is merely illustrative, and does not limit the structure of the above mobile terminal. For example, the mobile terminal may also include more or fewer components than shown in FIG. 8, or has a different configuration from that shown in FIG. 8.

The memory 804 may be configured to store a computer program, for example, a software program and module of application software, such as a computer program corresponding to the method for controlling a virtual camera in a game in the embodiment of the present disclosure, and the processor 802 executes various functional applications and data processing by running the computer program stored in the memory 804, that is, implements the above method. The memory 804 may include a high speed random access memory and may also include a non-volatile memory such as one or more magnetic storage devices, a flash memory, or other non-volatile solid state memories. In some examples, the memory 804 may further include memories remotely located relative to the processor 802, which may be connected to the mobile terminal over a network. The examples of such networks include, but are not limited to, the Internet, the Intranet, local region networks, mobile communication networks, and combinations thereof.

The transmission device 806 is configured to receive or send data via a network. The above specific network example may include a wireless network provided by a communication provider of the mobile terminal. In one example, the transmission device 806 includes a Network Interface Controller (NIC) that may be connected to other network devices through a base station to communicate with the Internet. In one example, the transmission device 806 may be a Radio Frequency (RF) module for communicating with the Internet wirelessly.

An embodiment of the present disclosure also provides an apparatus for controlling a virtual camera in a game. It is to be noted that the apparatus for controlling a virtual camera in a game in this embodiment may be configured to perform the method for controlling a virtual camera in a game in the embodiment of the present disclosure.

Figure 9:
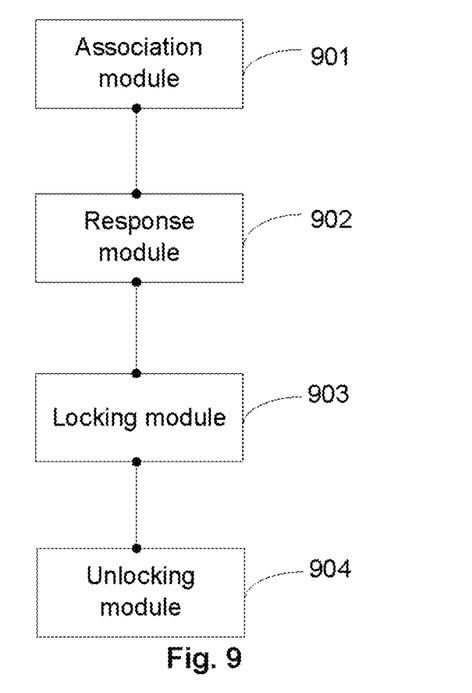
FIG. 9 is a schematic structural diagram of an apparatus for controlling a virtual camera in a game according to an embodiment of the present disclosure.

FIG. 9 is a schematic structural diagram of an apparatus for controlling a virtual camera in a game according to an embodiment of the present disclosure. The apparatus is applied to a touch terminal capable of presenting a GUI, content displayed by the GUI includes a game scene captured by a virtual camera, and the game scene includes at least one virtual character. As shown in FIG. 9, the apparatus includes: an association module 901, a response module 902, a locking module 903, and an unlocking module 904.

The association module 901 is configured to associate the virtual camera with a position of the virtual character in a game scene to control the movement of the virtual camera according to the position change of the virtual character.

The response module 902 is configured to provide a visual field control region on the GUI, respond to a first touch operation for the visual field control region, control the virtual camera to shift according to the first touch operation, and display a game scene captured by the shifted virtual camera on the GUI.

The locking module 903 is configured to control, in response to a preset virtual camera locking operation, the virtual camera to enter a locked state, and lock the game scene captured by the shifted virtual camera as the game scene rendered on the GUI.

The unlocking module 904 is configured to unlock, in response to trigger of a preset unlocking condition, the locked state to restore to control the movement of the virtual camera according to the position change of the virtual character.

In this embodiment, the response module 902 controls the virtual camera to shift according to the first touch operation received by the visual control region on the GUI, so as to adjust the game scene displayed on the GUI. After the virtual camera is adjusted, the locking module 903 controls the virtual camera to enter a locked state to lock the adjusted game scene displayed on the GUI. The unlocking module 904 unlocks locking of the virtual camera, and restores to control the movement of the virtual camera according to the change of the virtual character. Therefore, a user can place a camera in a suitable position with only simple operations, and it will not conflict with the original left-right handed operation, so that even if the virtual character is not in the middle of the screen, it can also have a very good visual field. It is more convenient to observe an image scene after dragging the screen, so that the user can focus on a truly fun operation experience, thereby solving the problems of high difficulty in frequent screen dragging operations or long-time screen dragging operations and easy misoperation.

An embodiment of the present disclosure also provides a storage medium. The storage medium stores a computer program, the computer program is configured to perform the steps in any one of the above method embodiments during running.

Optionally, in the present embodiment, the storage medium may include, but is not limited to, various media capable of storing a computer program such as a U disk, a Read-Only Memory (ROM), a Random Access Memory (RAM), a mobile hard disk, a magnetic disk or an optical disc.

An embodiment of the present disclosure also provides an electronic device, which includes a memory and a processor. The memory stores a computer program. The processor is configured to run the computer program to perform the steps in any one of the above method embodiments.

Optionally, the electronic device may further include a transmission device and an input/output device, the transmission device is connected to the processor, and the input/output device is connected to the processor.

It is apparent that those skilled in the art should understand that the above-mentioned modules or steps of the present disclosure may be implemented by a general-purpose computing device, and they may be centralized on a single computing device or distributed on a network composed of multiple computing devices. Optionally, they may be implemented with program codes executable by a computing device, so that they may be stored in a storage device and executed by the computing device, and in some cases, the steps shown or described may be performed in a different order than here, or they are separately made into individual integrated circuit modules, or multiple modules or steps therein are made into a single integrated circuit module for implementation. As such, the present disclosure is not limited to any particular combination of hardware and software.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the principle of the present disclosure shall fall within the scope of protection of the present disclosure.

INDUSTRIAL APPLICABILITY

The solution provided by the embodiments of the present application may be used to facilitate a user to manipulate a terminal to observe an image presented on a screen. In the technical solution provided by the embodiments of the present application, it may be applied to a device such as a mobile terminal. In response to a first touch operation for a visual field control region, a virtual camera is controlled to shift according to the first touch operation, and then the virtual camera is controlled to enter a locked state according to a locking operation, thereby locking a game scene captured by the shifted virtual camera as a game scene rendered on a graphical user interface until restoring to control the movement of the virtual camera according to the position change of a virtual character when the locked state is unlocked. Therefore, a user can place the virtual camera in a suitable position with only simple operations, and it will not conflict with the original left-right handed operation, so that even if the virtual character is not in the middle of the screen, it can also have a very good visual field. It is more convenient to observe an image scene after dragging the screen, so that the user can focus on a truly fun operation experience, thereby solving the problems of high difficulty in frequent screen dragging operations or long-time screen dragging operations and easy misoperation.

What is claimed is:

1. A method for controlling a virtual camera in a game, applied to a touch terminal rendered with a Graphical User Interface (GUI), content rendered on the GUI comprising a game scene captured by the virtual camera, the game scene at least comprising a virtual character, the method comprising:

associating the virtual camera with a position of the virtual character in the game scene to control a movement of the virtual camera according to a change of the position of the virtual character;

providing a visual field control region on the GUI, and in response to a first touch operation on the visual field control region, controlling the virtual camera to shift according to the first touch operation, and displaying a game scene captured by the shifted virtual camera on the GUI;

in response to a preset virtual camera locking operation, controlling the virtual camera to enter a locked state, and locking the game scene captured by the shifted virtual camera as the game scene rendered on the GUI; and in response to a trigger of a preset unlocking condition, unlocking the locked state to restore to control the movement of the virtual camera according to the change of the position of the virtual character.

2. The method as claimed in claim 1, wherein the preset unlocking condition comprises at least one of the followings:

detecting a second touch operation on the GUI;

detecting that a duration of the virtual camera entering the locked state satisfies a first preset duration;

detecting that a distance between the virtual character and a current location of the virtual camera exceeds a first preset distance; and, detecting that a distance of a movement of the virtual character exceeds a second preset distance after the virtual camera enters the locked state.

3. The method as claimed in claim 2, wherein the first touch operation and the second touch operation are both swipe operations, and the direction of the second touch operation is opposite to a direction of the first touch operation, the swipe operation is an operation of sliding on the visual field control region without changing the game scene.

4. The method as claimed in claim 2, wherein the first touch operation is a screen dragging operation, and the second touch operation is a clicking operation;

before controlling the virtual camera to enter the locked state, the method further comprises:

determining that a distance of movement of a touch point of the first touch operation is within a preset range.

5. The method as claimed in claim 2, wherein unlocking the locked state comprises:

controlling the virtual camera to move from the current location to a location before shifting.

6. The method as claimed in claim 5, wherein controlling the virtual camera to move from the current location to the location before shifting comprises:

detecting whether the virtual character moves towards the current location of the virtual camera;

when determining that the virtual character moves towards the current location of the virtual camera, controlling the virtual camera to move from the current location to the location before shifting in a speed descending manner; and when determining that the virtual character does not move towards the current location of the virtual camera, controlling the virtual camera to move from the current location to the location before shifting in a speed ascending manner.

7. The method as claimed in claim 6, wherein before controlling the virtual camera to move from the current location to the location before shifting in the speed descending manner or controlling the virtual camera to move from the current location to the location before shifting in the speed ascending manner, the method comprises:

determining that a duration of keeping the virtual character in the current orientation satisfies a second preset duration.

8. The method as claimed in claim 1, wherein the preset virtual camera locking operation comprises: an operation of pressing a touch screen of the touch terminal.

9. The method as claimed in claim 1, wherein after controlling the virtual camera to enter the locked state and before unlocking the locked state, the method further comprises:

receiving a third touch operation for adjusting the virtual camera; and outputting an error response for the third touch operation.

10. A non-transitory storage medium, storing a computer program, on which at least one computer program is stored, the at least one computer program being executed by a processor to implement the following steps:

associating the virtual camera with a position of the game scene where the virtual character is located to control the movement of the virtual camera according to the position change of the virtual character;

providing a visual field control region on the GUI, in response to a first touch operation acting on the visual field control region, providing a visual field control region on the GUI, controlling the virtual camera to shift according to the first touch operation, and displaying a game scene captured by the shifted virtual camera on the GUI;

in response to a preset virtual camera locking operation, controlling the virtual camera to enter a locked state, and locking the game scene captured by the shifted virtual camera to the game scene displayed on the GUI; and in response to the trigger of a preset unlocking condition, unlocking the locked state to restore to control the movement of the virtual camera according to the position change of the virtual character.

11. An electronic device, comprising a processor and a memory, connected with the processor and configured to store at least one executable instruction of the processor,
wherein the processor is arranged to execute the at least one executable instruction, and the at least one executable instruction comprises:
associating the virtual camera with a position of the game scene where the virtual character is located to control the movement of the virtual camera according to the position change of the virtual character;
providing a visual field control region on the GUI, in response to a first touch operation acting on the visual field control region, providing a visual field control region on the GUI, controlling the virtual camera to shift according to the first touch operation, and displaying a game scene captured by the shifted virtual camera on the GUI;
in response to a preset virtual camera locking operation, controlling the virtual camera to enter a locked state, and locking the game scene captured by the shifted virtual camera to the game scene displayed on the GUI; and
in response to the trigger of a preset unlocking condition, unlocking the locked state to restore to control the movement of the virtual camera according to the position change of the virtual character.

12. The method as claimed in claim 1, wherein the method further comprises:
determining a shifting direction of the virtual camera according to an acting direction of the first touch operation on the touch screen of the touch terminal.

13. The method as claimed in claim 12, wherein the shifting direction of the virtual camera is consistent with the movement direction of a touch point generated by the first touch operation on the touch screen of the touch terminal.

14. The method as claimed in claim 13, wherein the method further comprises:
determining a shifting distance of the virtual camera according to the distance and/or speed of the touch point generated by the first touch operation on the touch screen.

15. The method as claimed in claim 1, wherein the game scene displayed on the GUI remains unchanged when the virtual camera is in the locked state.

16. The method as claimed in claim 7, wherein the method further comprises:
unlocking when a staying duration at the position after the virtual camera shifting satisfies a certain duration, controlling the virtual camera to restore to the position before shifting and move with the virtual character.

17. The method as claimed in claim 16, wherein the method further comprises:
unlocking according to the staying duration at the position after the virtual camera shifting when a number of the second touch operation triggering the preset unlocking condition satisfies a preset number.

18. The method as claimed in claim 17, wherein the method further comprises:
determining the staying duration at the position after the virtual camera shifting according to a duration of unlocking by the second touch operation.

19. The method as claimed in claim 1, wherein the method further comprises:
controlling the virtual character to move when the virtual camera is in the locked state.

20. The method as claimed in claim 1, wherein the method further comprises:
establishing a mapping relationship for maintaining a fixed distance between the position of the virtual camera and the position of the virtual character in the game scene, wherein the shooting angle of the virtual camera is maintained at a default angle.

* * * * *